US 10,943,010 B2

(12) United States Patent
van Riel et al.

(10) Patent No.: US 10,943,010 B2
(45) Date of Patent: *Mar. 9, 2021

(54) GENERATION OF A RANDOM VALUE FOR A CHILD PROCESS (71) Applicant: Red Hat, Inc., Raleigh, NC (US)

(72) Inventors: Henri Han van Riel, Merrimack, NH (US); Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,139

(22) Filed: Nov. 25, 2019

(65) Prior Publication Data

US 2020/0097652 A1 Mar. 26, 2020

(51) Int. Cl.
*G06F 21/55* (2013.01)
*G06F 21/51* (2013.01)
*G06F 7/58* (2006.01)

(52) U.S. Cl.
CPC ............ *G06F 21/554* (2013.01); *G06F 21/51* (2013.01); *G06F 7/58* (2013.01)

(58) Field of Classification Search
CPC .................................................... G06F 21/554
See application file for complete search history.

(56) References Cited

U.S. PATENT DOCUMENTS

| 6,006,328 | A | 12/1999 | Drake |
| 7,668,310 | B2 | 2/2010 | Kocher et al. |
| 9,323,499 | B2 | 4/2016 | Hyde et al. |
| 9,485,222 | B2 | 11/2016 | Sturgill et al. |
| 2002/0059029 | A1 | 5/2002 | Todder et al. |
| 2007/0180509 | A1 | 8/2007 | Swartz et al. |
| 2016/0086185 | A1 | 3/2016 | Adjaoute |
| 2017/0061322 | A1 | 3/2017 | Chari et al. |

FOREIGN PATENT DOCUMENTS

| CN | 101622627 A | 1/2010 |
| CN | 102592082 | 12/2011 |

OTHER PUBLICATIONS

Gisbert, M. et al. "Preventing Brute Force Attacks Against Stack Canary Protection on Networking Servers". Instituto Tecnologico de Informatica. Universitat Politecnica de Valencia Camino de Vera s/n, 46022 Valencia, Spain. Retrieved on Jul. 31, 2017. http://hmarco.org/data/Preventing_brute_force_attacks_against_stack_canary_protection_on_networking_servers.pdf 8 pages.
Gisbert, H. M., & Ripoll, I. (Aug. 2014). "On the effectiveness of nx, ssp, renewssp, and aslr against stack buffer overflows". In Network Computing and Applications (NCA), 2014 IEEE 13th International Symposium on (pp. 145-152). IEEE. 2 pages.
Wagle, P. et al. StackGuard: Simple Stack Smash Protection for GCC. Immunix, Inc. https://ece.uwaterloo.ca/~vganesh/TEACHING/S2014/ECE458/Stackguard.pdf. 14 pages.

*Primary Examiner* — Simon P Kanaan
(74) *Attorney, Agent, or Firm* — Lowenstein Sandler LLP (57) ABSTRACT

Processes being executed by a host system and associated with a first address space layout may be identified. An indication of abnormal behavior from at least one of the processes that are being executed by the host system may be received. A request for a new process to be executed by the host system may be received. In response to the indication of the abnormal behavior and the request to provide the new process, a second address space layout may be generated for the new process that is different than the first address space layout. The new process may be generated in view of the second address space layout.

20 Claims, 6 Drawing Sheets

GENERATION OF A RANDOM VALUE FOR A CHILD PROCESS

RELATED APPLICATIONS

This application is a continuation application of co-pending U.S. patent application Ser. No. 15/690,059, filed Aug. 29, 2017, which is herein incorporated by reference.

TECHNICAL FIELD

Aspects of the disclosure relate generally to child processes and, more specifically, relate to the generation of a random value for a child process.

BACKGROUND

A process may use a random value to verify the security or integrity of the process as it is executed by a host system. For example, the process may compare the random value at a particular location associated with the host system with another random value that has been assigned to the process. If the random values match, then the process may continue to execute as the security of the process may be verified. Otherwise, if the random values do not match, then the execution of the process may be halted as the security of the process may be compromised.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure relate to the generation of a random value for a child process. A parent process may create or generate one or more child processes. The parent process may be a program that initiates a new child process in response to a new connection to a host system that is providing the parent process. For example, the host system may be a server where the parent process initiates a new child process for each client connection made to the host system.

The processes of the host system may generate a random value or number that is used to verify the security or integrity of a process that is executed by the host system. For example, the parent process may initially generate a random number and each child process may inherit or be assigned the random number. Each of the processes may compare the random number with another number at a particular location (e.g., in a stack between frames, a particular memory location, etc.) associated with the host system. If the random number assigned to a particular process does not match with the number at the particular location, then it may be assumed that the security of the process has been compromised and the execution of the particular process may be terminated.

Each child process utilizing the same random number of the parent process may result in susceptibility of the processes of the host system to an attack that may compromise the security of the various processes. For example, an attacker (e.g., an unauthorized entity) may attempt to guess the random number by varying each bit of the random number at various times. If the random number is a particular size, then the attacker may vary the first value of the random number checked by a child process (e.g., a first bit) and if the child process does not terminate, then the first bit of the random number may be known to the attacker. The attacker may continue this process until each bit of the random value or number is known. Since each process uses the same random number, then the security of every process provided by the host system may then be compromised when the attacker obtains the random number from one of the child processes.

Instead of each child process using the same random number or random value as the parent process that has created or generated it, a number (or other such value) may be randomly generated for each child process. For example, the parent process may use a first random number for itself while a second random number may be generated for use by the child process. However, generating a new random number for each child process may deplete system entropy of the host system that is used to generate the new random number. System entropy may correspond to information or data that is collected by the host system that is used by a random number generator to generate a random number or value. For example, the system entropy may include system entropy values where each value is obtained by using a characteristic of the host system (e.g., a timing of an interrupt that is received) and may be used in a further data transformation used to generate a random number. If a large number of random numbers are generated using the system entropy values of the host system, then the system entropy values of the host system may be depleted after some time as many child processes may be generated. As a result, execution of subsequent child processes may be delayed until subsequent system entropy values are generated.

Aspects of the present disclosure address the above and other deficiencies by generating the random number or random value for a child process in view of behavior of the child processes. For example, the random numbers used by the parent process and child processes and provided by a host system may be generated from a first random number generator operation and/or a second random number generator operation. The first random number generator operation (e.g., a pseudorandom number generator) may generate a random number while not using or depleting the system entropy values of the host system while the second random number generator operation may generate a random number while using or depleting the system entropy values of the host system. The first random number generator operation may be used to generate random numbers or values when the behavior of the child processes does not indicate malicious behavior from an attacker. For example, the first random number generator operation may be used when the behavior of the child processes terminating, restarting, or exiting from execution is normal or not indicative of an attack (e.g., the child processes are not crashing or terminating abnormally). When the behavior of the child processes does indicate malicious behavior, such as the child processes terminating, restarting, or exiting from execution too frequently, then the second random number generator operation that uses the system entropy may be used to generate subsequent random numbers or values for subsequently generated child processes. As a result, a more secure random operation may be used when potential malicious behavior is identified from the child processes.

Advantages of the present disclosure include, but are not limited to, an increase in security of processes executed by a host system while improving the efficiency of the host system to provide new child processes. For example, since the system entropy is used to generate enhanced random numbers in response to potential malicious behavior from an attacker of child processes, then the system entropy may not be depleted as quickly as it is not used for every child process. Furthermore, since the system entropy is not used for each child process, then the likelihood of system entropy being depleted is less likely and the generation of subsequent child processes is less likely to be halted until subsequent system entropy values are generated.

Figure 1:
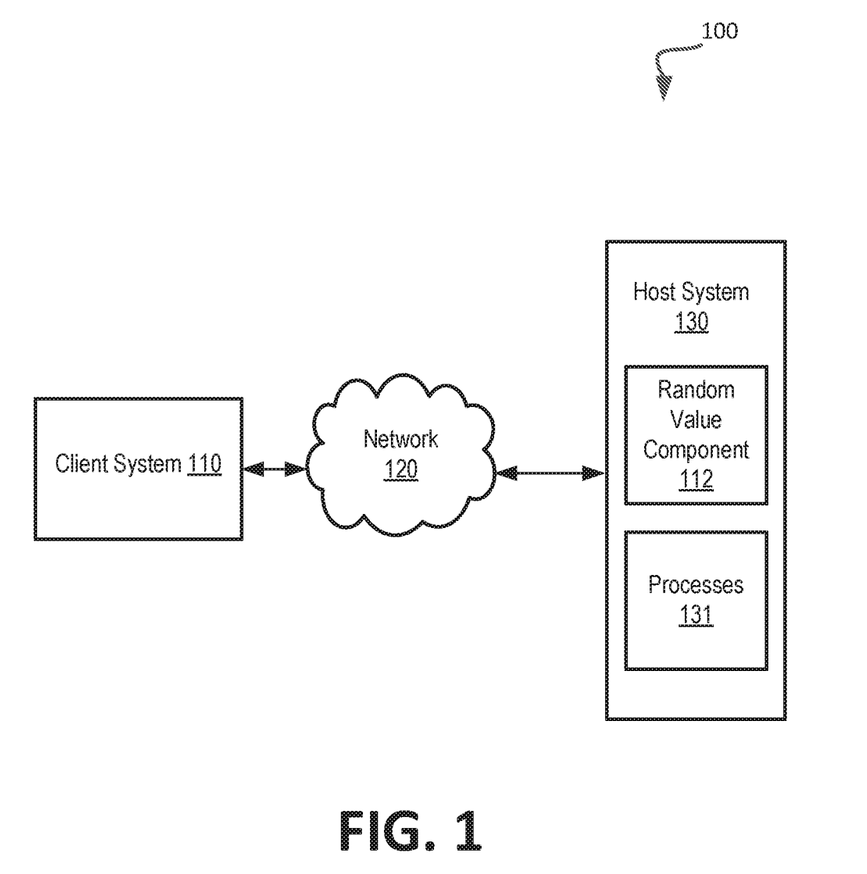
FIG. 1 illustrates an example system architecture in which embodiments of the disclosure may operate.

FIG. 1 is an example system architecture 100 for various implementations of the disclosure. The system architecture 100 may include host system 130 that is coupled to one or more client systems 110 via a network 120. The network 120 may be a public network (e.g., the Internet), a private network (e.g., a local area network (LAN) or wide area network (WAN)), or a combination thereof. Furthermore, the network 120 may include a wireless infrastructure, which may be provided by one or multiple wireless communications systems, such as a wireless fidelity (WiFi) hotspot connected with the network 120 and/or a wireless carrier system that can be implemented using various data processing equipment, communication towers, etc.

Any number of client systems 110 may access the host system 130 via the network 120. The client system 110 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The client system 110 may connect to the host system 130 over the network 120 to initiate a client session with the host system 130. For example, the client session may be created from a parent process from the processes 131 that is currently being provided by the host system 130.

The system architecture 100 may include a host system 130 that may include a random value component 112. As described in further detail below, the random value component 112 may create a random number (or another such random value) for a process from the processes 131 that is generated in response to a request from the client system 110 to initiate a client session with the host system 130. For example, the random value may be generated and used by a process corresponding to the client session of the client system 110 to verify the security of the generated process.

Figure 2:
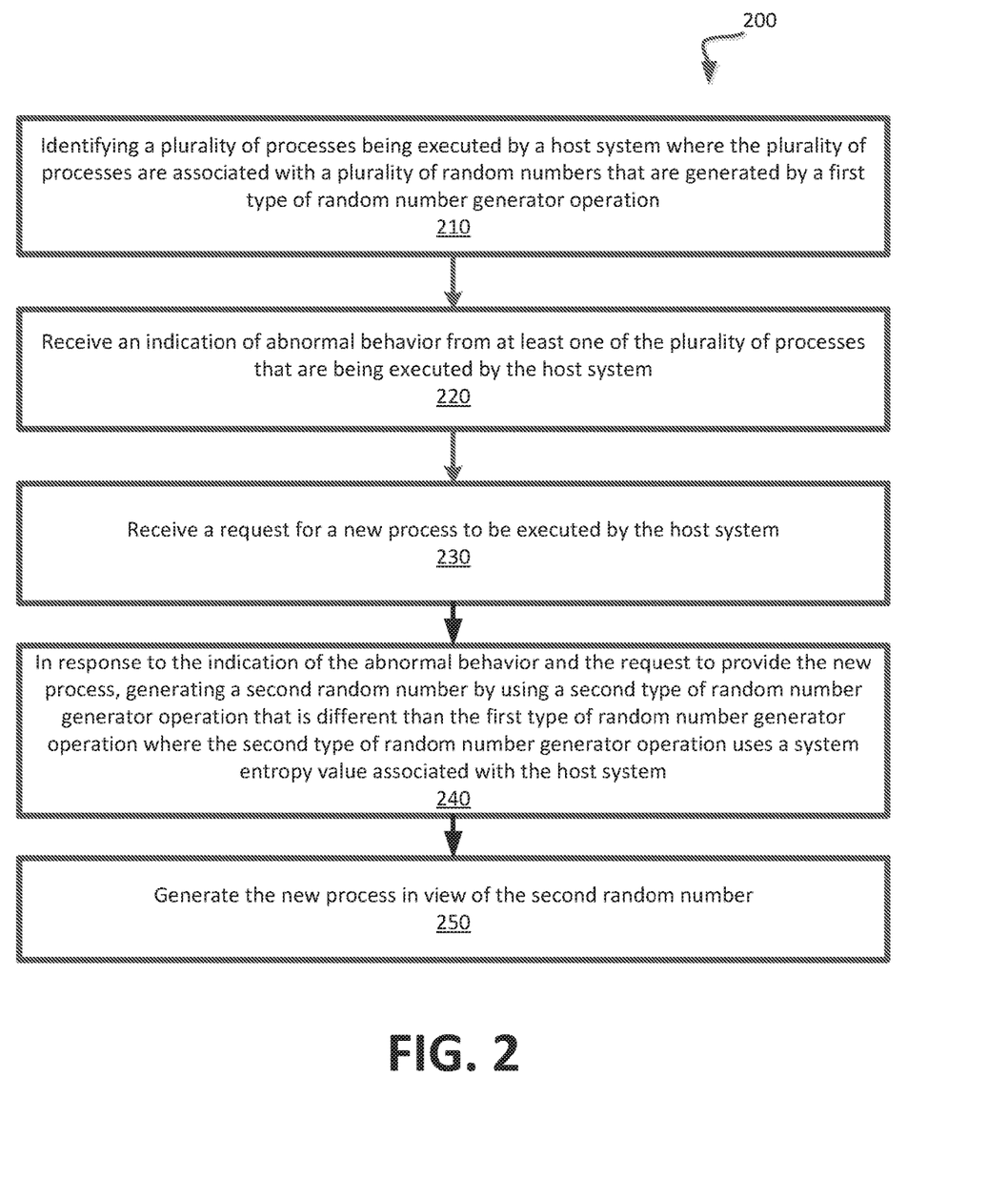
FIG. 2 is a flow diagram of an example method to generate a new random number for a child process in accordance with some embodiments of the disclosure.

FIG. 2 is a flow diagram of an example method 200 to generate a new random number for a child process. The method 200 may be performed by processing logic that may include hardware (e.g., processing device, circuitry, dedicated logic, programmable logic, microcode, etc.), software (e.g., instructions run or executed on a processing device), or a combination thereof. The method 200 may be performed by a random value component 112 as described with regard to FIG. 1.

As shown in FIG. 2, the method 200 may begin with the processing logic identifying a plurality of processes being executed by a host system where the plurality of processes are associated with a plurality of random numbers that are generated by a first type of random number generator operation (block 210). For example, a parent process and one or more child processes may be executed by the host system. The child processes may perform an identical or similar function of the parent process (e.g., each child process may provide a client session). The random numbers for the processes may be used to verify the security of the processes. For example, a particular child process may be generated and be assigned or may use a particular random number. The child process may then periodically compare the assigned random number with another random number that is stored with data that is used by the child process. For example, the child process may store a value of the assigned random number with other data used by the child process. If the assigned random number does not match with another random number that is stored with data that is used by the child process, then the child process may determine that an error has occurred and/or that the security of the child process may have been compromised by an attacker. In response to such a determination, the child process may exit or terminate (e.g., no longer be executed by the host system).

Referring to FIG. 2, the processing logic may receive an indication of abnormal behavior from at least one of the plurality of processes that are being executed by the host system (block 220). The abnormal behavior may correspond to a possible security concern with the processes (e.g., an attacker may be accessing at least one of the processes in an attempt to obtain a random value that is used by at least one of the processes). The indication of the abnormal behavior may be received when the crashing, exiting, or unexpected termination of child processes exceeds a threshold number of crashes. In some embodiments, the unexpected termination of a child process may be identified from exit codes that are provided by a child process when being terminated. For example, a first exit code may indicate a normal, scheduled, or expected termination of a child process (e.g., a client session being ended by a client) and a second exit code may indicate an abnormal or unscheduled exit of a child process (e.g., an assigned random number does not match with another random number). In the same or alternative embodiments, the indication of the abnormal behavior may be received when a total number of child processes that have crashed exceeds a threshold number, when a frequency of child process crashing exceeds a threshold frequency, when an interval between crashes is smaller than a particular interval, etc. Other indications of abnormal behavior may correspond to an unexpected behavior of a child process. For example, the child process accessing particular resources of the host system or another such activity of the child process may be identified as being indicative of abnormal behavior.

The processing logic may further receive a request for a new process to be executed by the host system (block 230). For example, a new child process may be generated from the parent process in response to a client system connecting to the host system. Subsequently, in response to the indication of the abnormal behavior and the request to provide the new process, the processing logic may generate a second random number by using a second type of random number generator operation that is different than the first type of random number generator operation (block 240). The second type of random number generator operation may use a system entropy value associated with the host system. The system entropy value may be a value that is generated or received by using system entropy of the host system. In some embodiments, the system entropy of the host system may be or correspond to random events that are detected by the host system. Such random events may be a type of interrupt (e.g., a hardware interrupt) and/or when the interrupt is received, a particular central processing unit cycle of the host system when the interrupt is received, another characteristic event of the host system, another event received or identified by the host system, or any combination thereof.

The second type of random number generator operation may receive a system entropy value and another input value and may generate a random number by using the system entropy value as one of the inputs. After the use of the system entropy value, the value may be removed from a group of available system entropy values. Further details with regards to the system entropy values are described in conjunction with FIG. 3. The first type of random number generator operation may receive one or more input values and may not receive any system entropy value and may generate a random number without using any of the system entropy values. The use of the system entropy value may be considered to enhance the randomization of the random number that is generated. Thus, the second type of random number generator operation may be considered to be a more enhanced type of random number generator operation than the first type of random number generator operation. The second type of random number generator operation may include an additional input when compared with the first type of random number generator operation.

As shown in FIG. 2, the processing logic may subsequently generate the new process in view of the second random number (block 250). For example, the second random number that is generated by using a system entropy value may be assigned to the new process when the new process is to verify the assigned second random number with another value that is stored with data that the new process generates and stores at the host system or a storage resource associated with the host system.

Thus, processes may be generated with assigned random values that do not deplete or use system entropy values. If malicious behavior is indicated from the activity of the processes, then a subsequent process may be generated with another assigned random value that does deplete or use the system entropy values.

Figure 3:
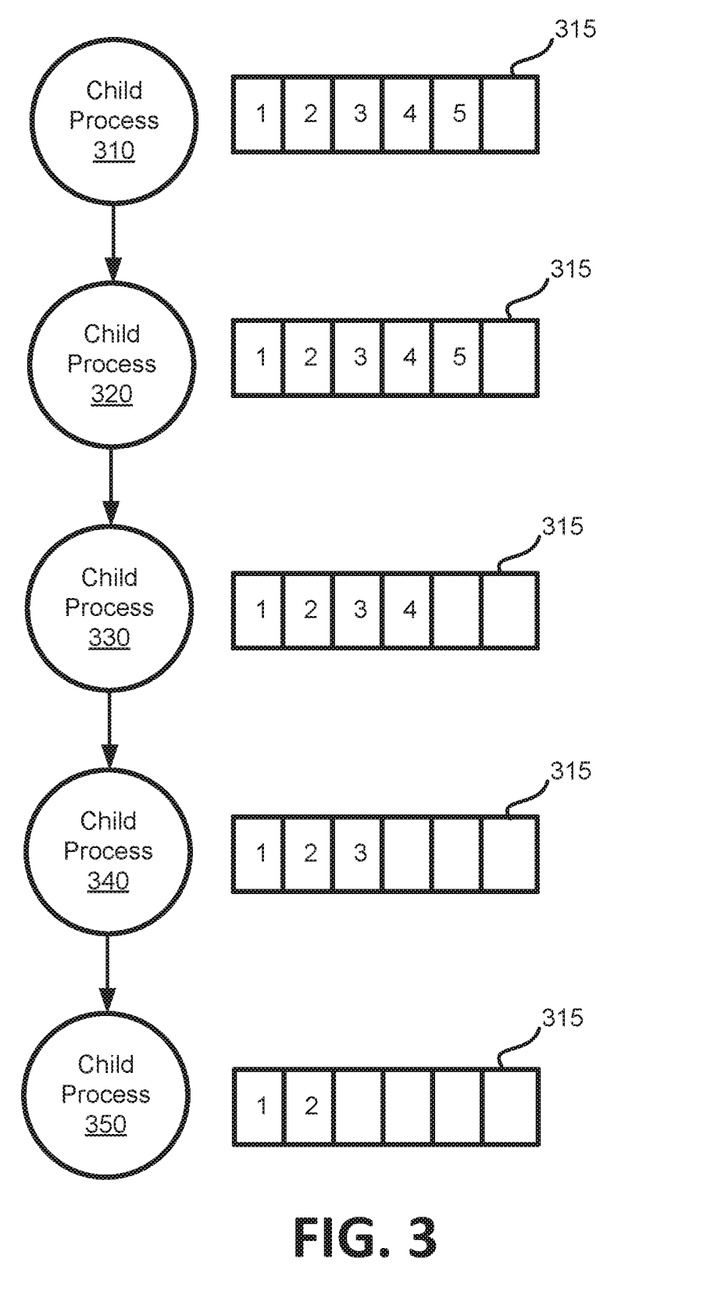
FIG. 3 illustrates system entropy when generating new processes in accordance with some embodiments.

FIG. 3 illustrates system entropy when generating new processes. In general, system entropy values 315 may be used or not used by the random value component 112 as described with regard to FIG. 1.

As shown in FIG. 3, a first child process 310 may be executed or generated. For example, the first child process 310 may be generated by or from a parent process that is currently being executed. The first child process 310 may be assigned a different randomly generated number than the parent process. For example, the parent process may be assigned a first random number and when the first child process 310 is generated, a second random number may be generated for the first child process 310. The random numbers assigned to and used by the parent process and the first child process 310 may be generated without using a system entropy value. Thus, the system entropy values 315 that are available to a host system may not be depleted or used to generate the first or second random numbers. Another child process 320 may be generated at a subsequent time and may be assigned another random number that is not generated by using any of the system entropy values 315. As such, the system entropy values 315 may not be depleted or used to generate the random number for the child process 320.

After the child process 320 has been generated, abnormal behavior of the child processes that have already been generated may be detected. For example, as previously described, child processes may be crashing or exiting and may indicate a potential security attack of the exiting or crashing child processes. A request to generate the child process 330 may be received after the generating of the child processes 310 and 320 and after the abnormal behavior of the previously generated child processes has been detected. The child process 330 may then be generated by assigning an enhanced random number to the child process 330 that uses a system entropy value from the system entropy values 315. After the system entropy value has been used, the used system entropy value may be removed from the system entropy values 315. For example, the used system entropy value may not be used again to generate another enhanced random value unless the same value is generated again from the system entropy. Child processes 340 and 350 may continue to be generated by depleting the system entropy values 315. For example, as shown, after the child process 340 is generated then the system entropy values may lose a system entropy value and after the child process 350 is generated then the system entropy values may be further depleted. In some embodiments, subsequent child processes may continue to use the system entropy values until the abnormal behavior of the previously generated child processes is no longer detected or if the system entropy values have been depleted.

Although not shown, additional system entropy values may be added to the system entropy values 315 based on characteristics of the host system (e.g., the receiving of a hardware interrupt) as previously described. Thus, in some embodiments, if the system entropy values 315 are depleted (e.g., there are no current system entropy values that have not been used to generate a random number), then the execution of a newly requested child process may pause or wait until a new system entropy value is added.

Figure 4:
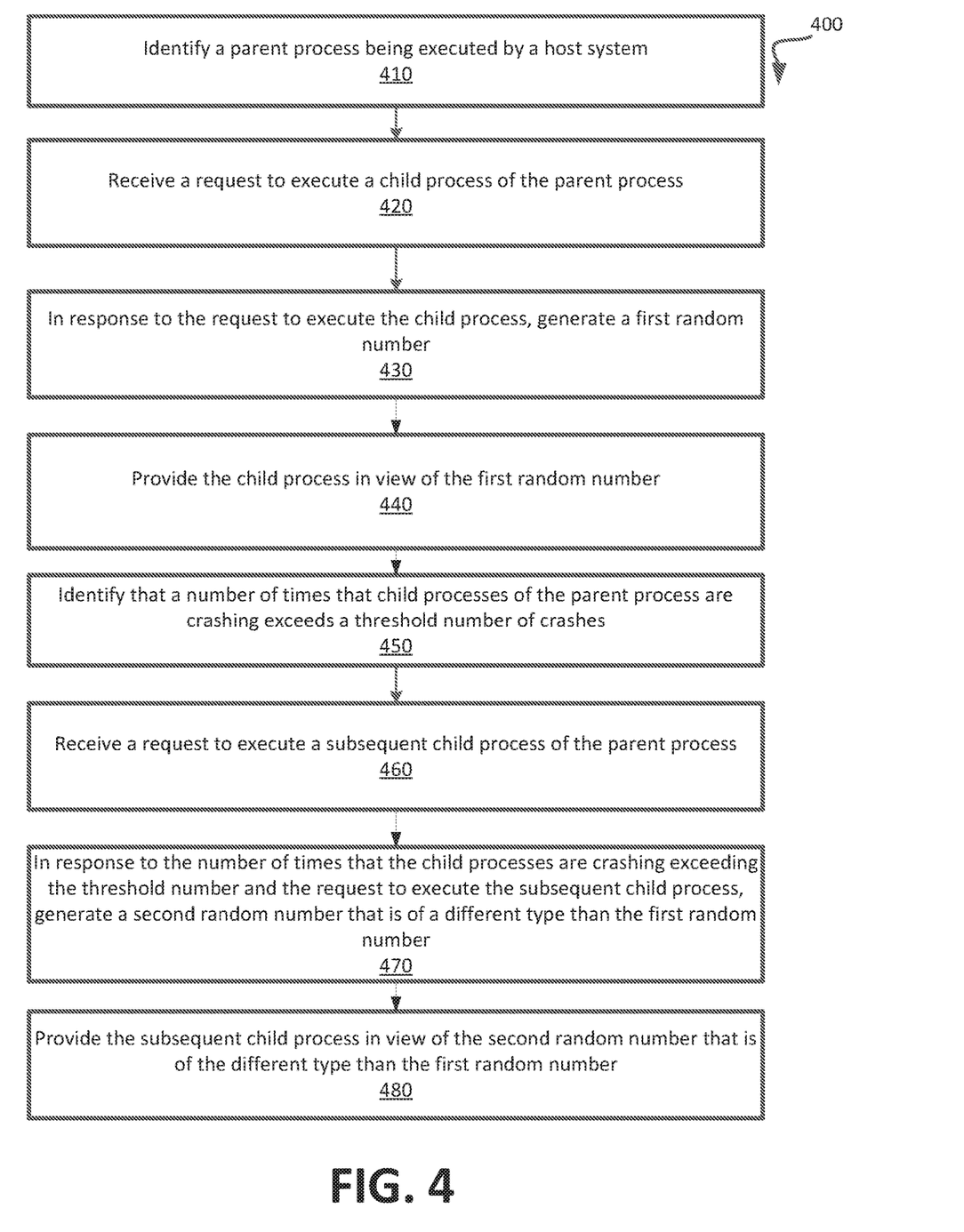
FIG. 4 is a flow diagram of an example method to generate a new random number in response to a request to execute a new process in accordance with some embodiments of the disclosure.

FIG. 4 is a flow diagram of an example method 400 to generate a new random number to generate a new process. The method 400 may be performed by processing logic that may include hardware (e.g., processing device, circuitry, dedicated logic, programmable logic, microcode, etc.), software (e.g., instructions run or executed on a processing device), or a combination thereof. The method 400 may be performed by a random value component 112 as described with regard to FIG. 1.

As shown in FIG. 4, the method 400 may begin with the processing logic identifying a parent process being executed by a host system (block 410). The processing logic may further receive a request to execute a child process of the parent process (block 420). For example, the parent process may correspond to a client session and the child process request may be received in response to a client system connecting with the host system to be provided another client session. The processing logic may generate a first random number in response to the request to execute the child process (block 430). For example, a first type of random number generator operation may be used to generate the first random number without using system entropy as an input value. For example, the first type of random number generator operation may be a pseudorandom number generator that receives a seed or initial value and generates a sequence of random numbers. The first type of random number generator operation may be considered one or more transformations of values that do not include a system entropy value. The processing logic may subsequently provide the child process in view of the first random number (block 440). For example, the child process may be generated by using the first random number and/or the first random number is assigned to the child process for verifying the security of the child process as previously described.

Referring to FIG. 4, the processing logic may identify that a number of times that child processes of the parent process are crashing exceeds a threshold number of crashes (block 450). For example, the child processes that are being executed by the host system may be crashing in response to an assigned random value of a corresponding child process not matching with a compared value received by the corresponding child process. The processing logic may further receive a request to execute a subsequent child process of the parent process (block 460). In response to the number of times of child processes crashing exceeding the threshold number of crashes and the request to execute the subsequent child process, the processing logic may generate a second random number that is of a different type than the first random number (block 470). For example, a different random number generator operation may be used to generate the second random number than the type of random number generator operation that may be used to generate the first random number. The second random number may be generated by one or more transformations of values that includes a system entropy value and another input value. In some embodiments, the second type of random number generator operation may include the same types of input values of the first type of random number generator operation in addition to the system entropy value that is not used by the first type of random number generator operation. The processing logic may subsequently provide the subsequent child process in view of the second random number that is of the different type than the first random number (block 480).

In some embodiments, an address space layout of the subsequent child process may be different if the number of crashes of the child processes exceeds the threshold number. The address space layout of a process may be the portions or areas of memory that are assigned to a process for storing and/or retrieving data. Thus, if malicious behavior is indicated by the threshold number of crashes being satisfied or by another indication as previously described, then the address space layout of a subsequently generated process may be randomized so that the expected address space layout is not the same as previously generated address space layouts. In some embodiments, the generating of the random number by using a system entropy value and the changing of the address space layout may be used in conjunction for generating a subsequent child process when malicious behavior is indicated. In some embodiments, the address space layout may be randomized by using the generated random number.

Thus, if child processes are crashing but the number of child processes crashing does not exceed the threshold number, then the first type of random number generator operation may continue to be used to generate new child processes. Once the number of child processes crashing exceeds the threshold number, then the second type of random number generator operation may be used to generate new child processes.

In some embodiments, the random number is changed in the parent process so that a subsequent child process may be generated from the parent process with the changed random number. For example, the child process may be identical to the parent process and include the same functionality and/or values of the parent process. Thus, the random number used in the parent process may be changed in response to a request to generate a subsequent child process. The random number may be changed by using the first type of random number generator operation or the second type of random number generator operation.

Figure 5:
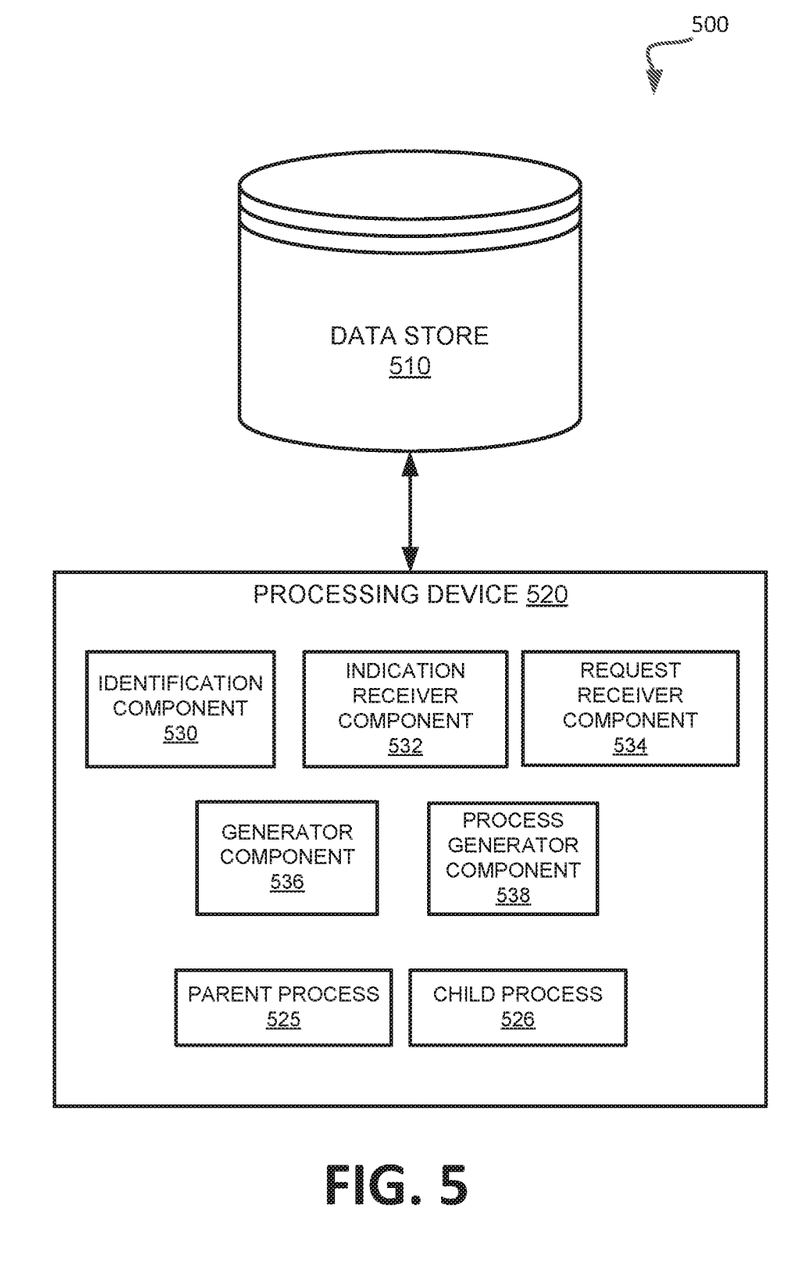
FIG. 5 illustrates an example apparatus in which implementations of the disclosure may operate in accordance with one or more aspects of the present disclosure.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components discussed herein. Furthermore, the data store 510 may store information (e.g., information identifying instances when processes have crashed).

The apparatus 500 may include a processing device 520. The processing device 520 may include an identification component 530, an indication receiver component 532, a request receiver component 534, a generator component 536, and a process generator component 538. Furthermore, the processing device 520 may provide or execute a parent process 525 and a child process 526.

The identification component 530 may identify processes that are being executed by a host system. The processes may be associated with random numbers that are generated by a first type of random number generator operation. The indication receiver component 532 may receive an indication of abnormal behavior from at least one of the processes that are being executed by the host system. The abnormal behavior may correspond to child processes being terminated. The request receiver component 534 may further receive a request for a new process to be executed by the host system. For example, a new child process of a parent process may be requested to be generated. The generator component 536 may generate a second random number by using a second type of random number generator operation that is different than the first type of random number generator operation. For example, the second type of random number generator operation uses a system entropy value associated with the host system. The process generator component 538 may generate a new process in view of the second number. For example, the child process 526 may be generated from the parent process 525 and the second random number.

Figure 6:
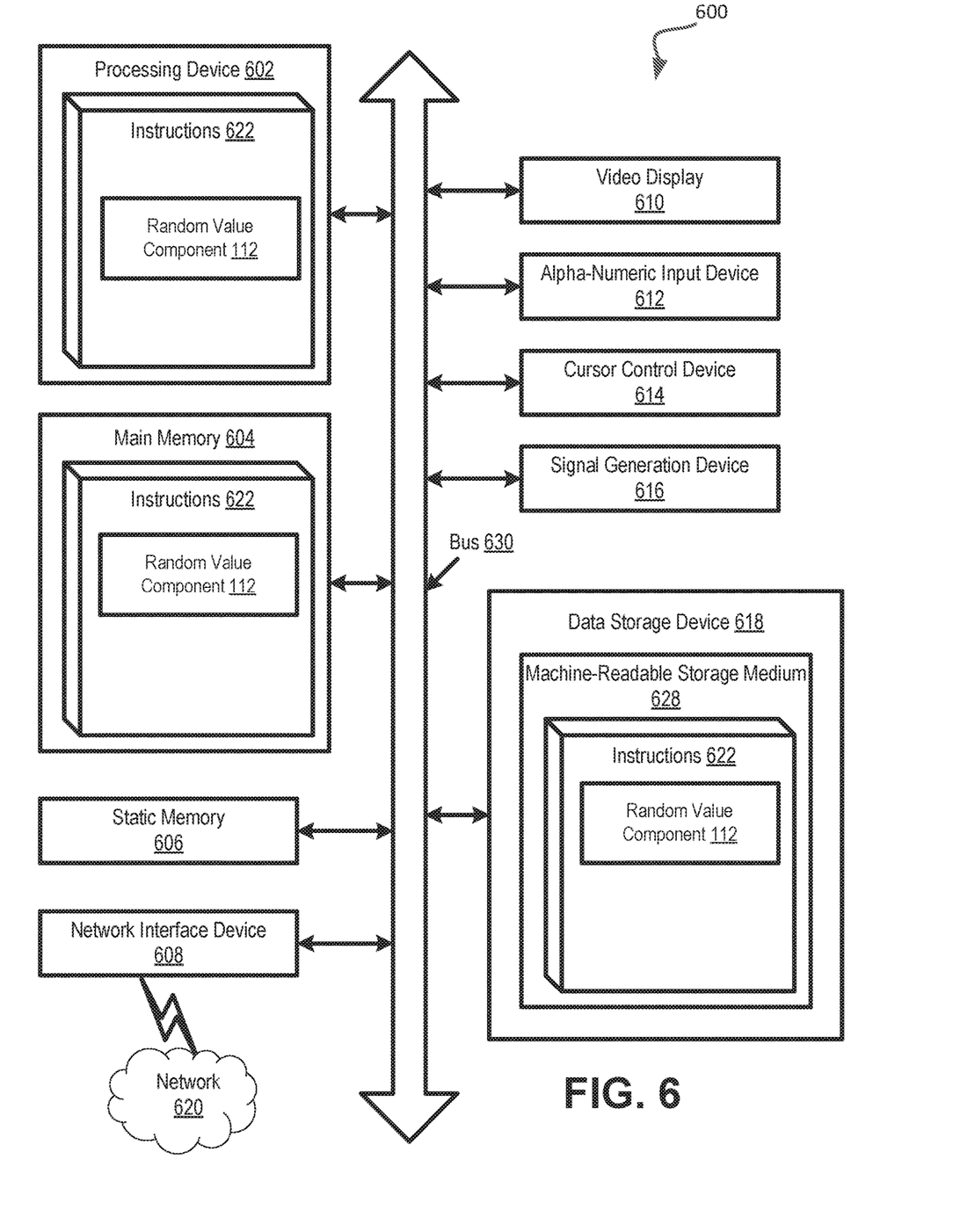
FIG. 6 illustrates a block diagram of an embodiment of a computer system in which some embodiments of the disclosure may operate.

FIG. 6 illustrates a block diagram of an embodiment of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a random value component (e.g., random value component 112 of FIG. 1) and/or a software library containing methods that call operations of a random value component. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
identifying a plurality of processes being executed by a host system, the plurality of processes being associated with a first address space layout;
receiving an indication of abnormal behavior from at least one of the plurality of processes that are being executed by the host system;
receiving a request for a new process to be executed by the host system;
in response to the indication of the abnormal behavior and the request to provide the new process, generating, by a processing device, a second address space layout for the new process that is different than the first address space layout; and
generating the new process in view of the second address space layout.

2. The method of claim 1, wherein generating the second address space layout for the new process comprises:
generating a random number using a first type of random number generator operations; and
randomizing the second address space layout using the generated random number.

3. The method of claim 1, wherein the first type of random number generator operation uses a system entropy value as an input to generate the random number.

4. The method of claim 1, wherein the first type of random number generator operation does not use any system entropy value as an input to generate the random number.

5. The method of claim 1, wherein receiving the indication of the abnormal behavior from at least one of the plurality of processes comprises:
identifying that the plurality of processes have crashed or restarted a particular number of times; and
determining whether the particular number of times that the plurality of processes have crashed or restarted exceeds a threshold number of times, wherein the indication is received when the particular number of times satisfies the threshold number.

6. The method of claim 2, wherein the system entropy value is generated at a time that is in view of a characteristic of the host system.

7. The method of claim 1, wherein the plurality of processes comprise a parent process and a plurality of child processes, each of the plurality of child processes being generated by the parent process in response to a different client connection to the host system.

8. A system comprising:
a memory; and
a processing device, operatively coupled with the memory, to:
identify a plurality of processes being executed by a host system, the plurality of processes being associated with a first address space layout;
receive an indication of abnormal behavior from at least one of the plurality of processes that are being executed by the host system;
receive a request for a new process to be executed by the host system;
in response to the indication of the abnormal behavior and the request to provide the new process, generate a second address space layout for the new process that is different than the first address space layout; and
generate the new process in view of the second address space layout.

9. The system of claim 8, wherein to generate the second address space layout for the new process, the processing device is to:
generate a random number using a first type of random number generator operations; and
randomize the second address space layout using the generated random number.

10. The system of claim 8, wherein the first type of random number generator operation uses a system entropy value as an input to generate the random number.

11. The system of claim 8, wherein the first type of random number generator operation does not use any system entropy value as an input to generate the random number.

12. The system of claim 8, wherein to receive the indication of the abnormal behavior from at least one of the plurality of processes, the processing device is to:
identify that the plurality of processes have crashed or restarted a particular number of times; and
determine whether the particular number of times that the plurality of processes have crashed or restarted exceeds a threshold number of times, wherein the indication is received when the particular number of times satisfies the threshold number.

13. The system of claim 9, wherein the system entropy value is generated at a time that is in view of a characteristic of the host system.

14. The system of claim 8, wherein the plurality of processes comprise a parent process and a plurality of child processes, each of the plurality of child processes being generated by the parent process in response to a different client connection to the host system.

15. A non-transitory machine-readable storage medium including data that, when accessed by a processing device, cause the processing device to:
identify a plurality of processes being executed by a host system, the plurality of processes being associated with a first address space layout;
receive an indication of abnormal behavior from at least one of the plurality of processes that are being executed by the host system;
receive a request for a new process to be executed by the host system;
in response to the indication of the abnormal behavior and the request to provide the new process, generate a second address space layout for the new process that is different than the first address space layout; and
generate the new process in view of the second address space layout.

16. The non-transitory machine-readable storage medium of claim 15, wherein to generate the second address space layout for the new process, the processing device is to:
generate a random number using a first type of random number generator operations; and
randomize the second address space layout using the generated random number.

17. The method of claim 1, wherein the first type of random number generator operation uses a system entropy value as an input to generate the random number.

18. The non-transitory machine-readable storage medium of claim 15, wherein the first type of random number generator operation does not use any system entropy value as an input to generate the random number.

19. The non-transitory machine-readable storage medium of claim 16, wherein the system entropy value is generated at a time that is in view of a characteristic of the host system.

20. The non-transitory machine-readable storage medium of claim 15, wherein the plurality of processes comprise a parent process and a plurality of child processes, each of the plurality of child processes being generated by the parent process in response to a different client connection to the host system.

* * * * *